UNITED STATES PATENT OFFICE.

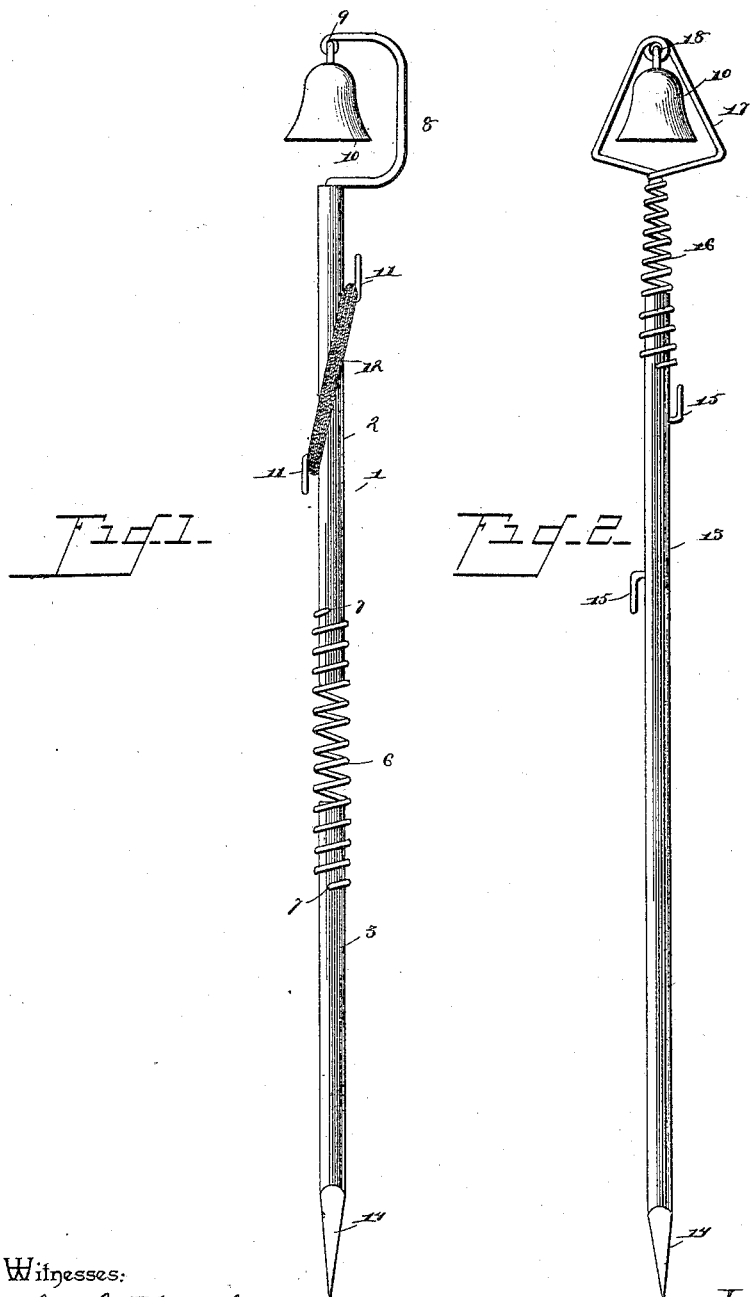

ISRAEL BUSHONG, OF NEW HOLLAND, PENNSYLVANIA.

FISHING-TACKLE.

SPECIFICATION forming part of Letters Patent No. 449,202, dated March 31, 1891.

Application filed May 5, 1890. Serial No. 350,668. (No model.)

*To all whom it may concern:*

Be it known that I, ISRAEL BUSHONG, a citizen of the United States, residing at New Holland, in the county of Lancaster and State of Pennsylvania, have invented a new and useful Fishing-Tackle, of which the following is a specification.

This invention has relation to improvements in fishing-tackle; and the objects of the invention are to produce an inexpensive and simple fishing-tackle so constructed as to require little or no attention upon the part of the fisherman until after a bite has been given at the bait and to provide means of apprising or notifying the fisherman of such fact, whereby a fisherman may attend to several independent lines.

Other objects and advantages of the invention will hereinafter appear, and the novel features thereof will be particularly pointed out in the claims.

Referring to the drawings, Figure 1 is an elevation of a fishing-tackle constructed in accordance with my invention. Fig. 2 is a similar view of a modified construction.

Like numerals of reference indicate like parts in both figures of the drawings.

In practicing my invention I provide a light rod 1, which itself may be resilient, but in this instance is formed by flexibly-connected upper and lower sections 2 and 3, the lower section 3 being preferably sharpened or reduced, so as to adapt it for a ready insertion into the ground. The adjacent ends of the two sections are connected in this instance by a coiled spring 6, the ends being spaced a slight distance apart, so as to permit of lateral vibrations of the upper section. The opposite ends of the coil receive the ends of the sections, and the ends of the wire are preferably driven into the sections, as shown at 7. In lieu of the form of joint herein shown, other forms of flexible joints will readily suggest themselves.

The upper end of the upper section 2 is provided with a curved wire bell-standard 8, which terminates at its upper extremity in an eye 9, in which is loosely suspended a bell 10. The upper section is further provided with two L-shaped sections 11, they being arranged at opposite sides of the section, and one located near the top and the other near the bottom of the said section. The L-shaped sections 11, it will be apparent, combine to form a cleat, and upon the same is wound, when not in use, the line 12, which is provided with the usual hooks and sinker incidental to a fishing-line.

In Fig. 2 I have illustrated a modification of my invention, and in said figure 13 designates the rod, which is of proper length, the lower end of which is reduced to form an entering point 14, and near its upper end is provided with the cleat-sections 15; or, in other words, the rod is of the same construction as the one previously described, with the exception that it is not formed in sections. At the upper end of the rod is located a spring-section 16, the same consisting merely of a coil of wire or other flexible material, the lower end of which fits snugly over the rod, and beyond the coil the wire is bent to form a loop or bell-standard 17, provided at its center with an eye 18, in which is loosely suspended a bell.

The standards of either form described having been inserted in the ground, the line, properly baited, is thrown overboard. Any slight pull upon the line—as, for instance, the snapping up of the bait or nibbling at the same by a fish—will cause the rod to vibrate, sounding the bell, by which the fisherman is notified, and it simply remains for him to take the line and land the fish. In this manner a single fisherman can handle as many lines as he desires, and that without requiring any strict attention, except at such times that the alarm sounds.

When using the construction of rod shown in Fig. 2, the line is left sufficiently slack to wind a portion of the same around the spring-coiled section, as shown, so that the latter alone is caused to vibrate.

If desired, the bell may be mounted directly upon the rod and the standard omitted.

Having described my invention, what I claim is—

1. The herein-described fishing-tackle, the same consisting of a rod adapted to be inserted in the ground, an alarm-bell, and a flexible laterally-movable connection between the upper end of the rod and the support for the bell, substantially as and for the purpose set forth.

2. The herein-described fishing-tackle, the same consisting of a rod reduced at one end, whereby it is adapted to be inserted into the ground, and consisting of rigid sections flexibly connected at their adjacent ends, so that one of said sections may vibrate relatively to the other, the upper section being provided with an alarm or bell and by reason of its connection adapted to vibrate, substantially as specified.

3. The rod composed of upper and lower separate sections and the spring-coil connecting the adjacent ends of the same, the upper section, by reason of said spring connection, being adapted to vibrate laterally, the cleat-pins secured to the upper section, the line secured to the pins and adapted to wind thereon, and the bell-standard located at the upper end of the upper section and the bell loosely suspended therein.

In testimony that I claim the foregoing as my own I have hereto affixed my signature in presence of two witnesses.

ISRAEL BUSHONG.

Witnesses:
  E. C. DILLER,
  E. V. SMITH.